Dec. 1, 1931.  P. B. CAMP  1,834,574
BRAKE ADJUSTER
Original Filed Sept. 13, 1928   2 Sheets-Sheet 1
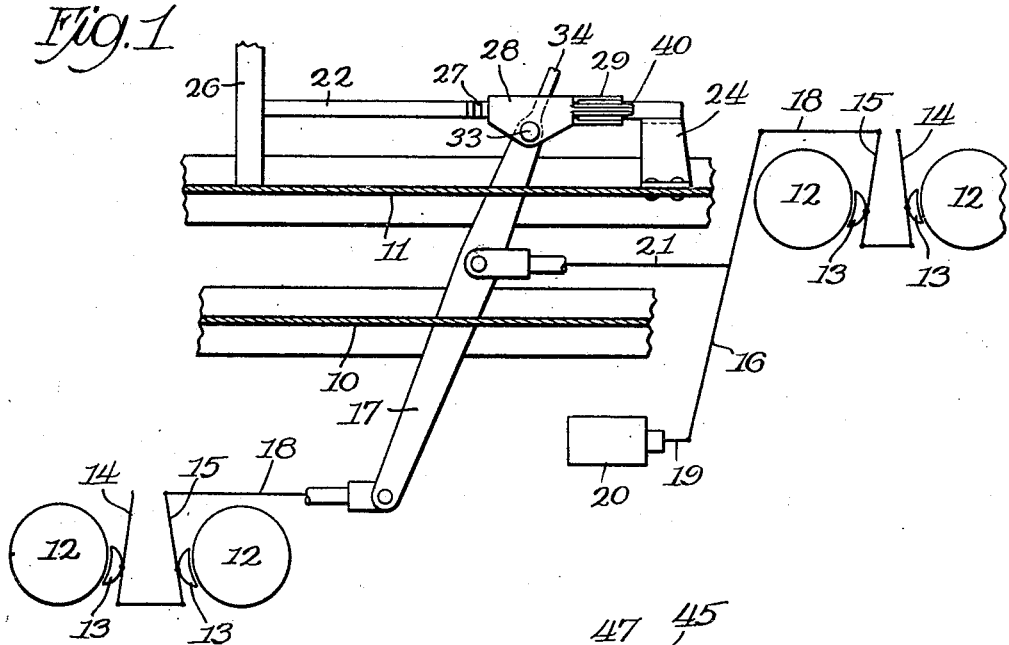
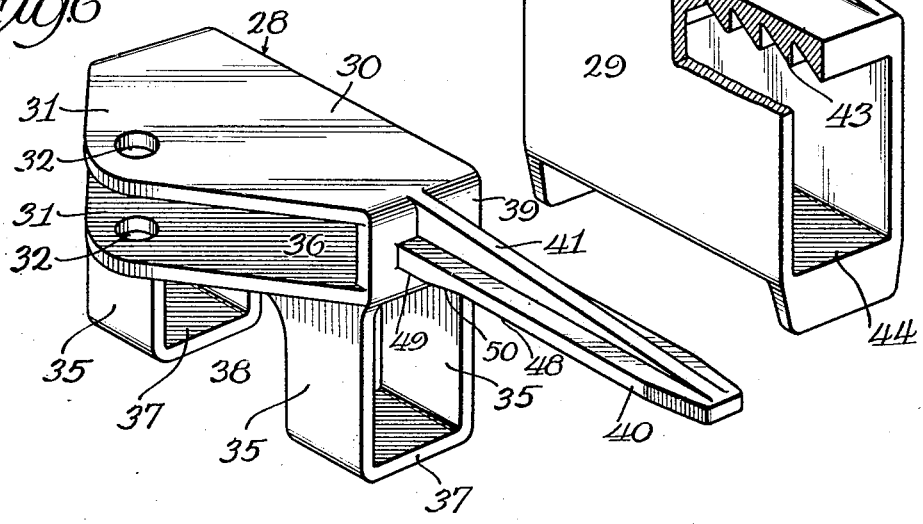
Inventor:
Percy B. Camp
By Wilson, Mann & Cox, Attys.

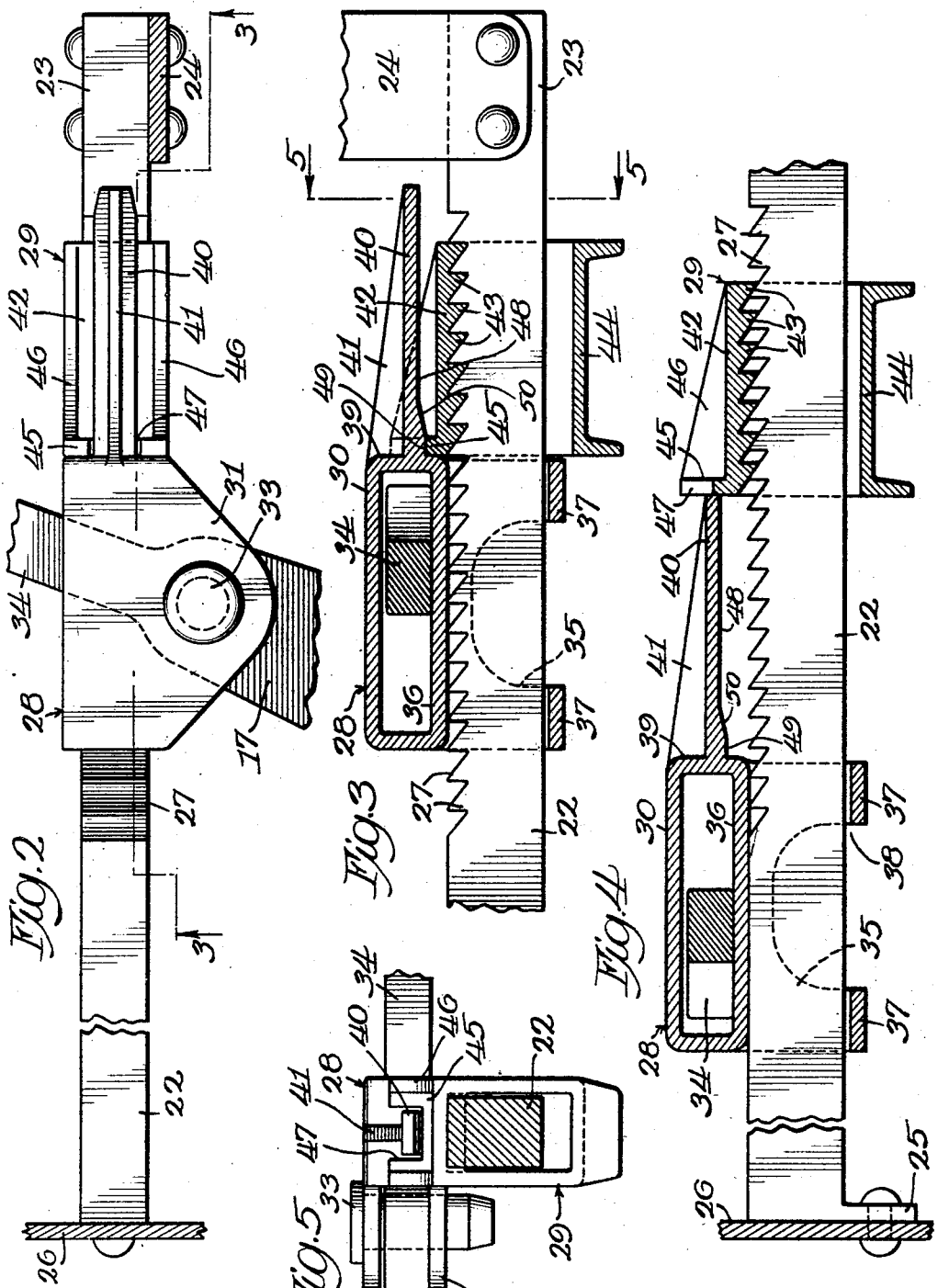

Patented Dec. 1, 1931

1,834,574

UNITED STATES PATENT OFFICE

PERCY B. CAMP, OF MAYWOOD, ILLINOIS, ASSIGNOR TO UNIVERSAL DRAFT GEAR ATTACHMENT CO., A CORPORATION OF ILLINOIS

BRAKE ADJUSTER

Application filed September 13, 1928, Serial No. 305,675. Renewed June 16, 1930.

This invention relates to brake mechanism and has for its principal objects to enable unskilled persons to make correct brake adjustments, to provide a gauge for insuring proper brake shoe clearance, and to simplify structures of this class. Further objects and advantages of the invention will be revealed as the disclosure proceeds and the description is read in connection with the accompanying drawings in which Fig. 1 is a diagrammatic view illustrating an application of the invention to a conventional form of foundation brake gear in common use on freight cars;

Fig. 2 is a plan view of the preferred embodiment of the invention shown in connection with a fragment of a dead cylinder lever;

Figs. 3 and 4 are sectional views taken on the line 3—3 of Fig. 2, showing the parts first, in their normal operative position and, second, in positions they assume during the operation of adjusting the brake mechanism;

Fig. 5 is a sectional view taken on the line 5—5 of Fig. 3;

Fig. 6 is a perspective view of a rider upon which the cylinder lever is fulcrumed, and Fig. 7 is a perspective view of a buttress for limiting movement of the rider in one direction.

But this specific illustration and the correspondingly specific description are used for the purpose of disclosure only, and are not intended to impose limitations on the scope of the patent, for it is realized that the substance of the invention may be embodied in other forms and put to other applications.

Referring now to Fig. 1, 10 and 11 indicate draft sills of the car underframe mounted on trucks including wheels 12 to which brake shoes 13 are applied by dead levers 14 and live levers 15, receiving power from live cylinder lever 16 and dead cylinder lever 17 through connection 18. One end of the live cylinder lever is operatively connected with the push rod 19 of an air cylinder 20, and it transmits power to the dead cylinder through a cylinder lever connection 21.

Brake mechanisms of this general character are in common use in various forms, which are selected to suit particular service.

The specific attachment used to illustrate the preferred form of this invention is best shown in Figs. 2, 3, 4 and 5, and takes the place of the ordinary fixed fulcrum for the dead cylinder lever 17. It includes a rack 22 having one end 23 secured to the draft sill 11 by a bracket 24, the other end (Fig. 4) is bent laterally to form an arm 25 which is secured to a cross sill 26.

The body portion of the rack is rectangular in cross section, as best illustrated in Fig. 5, and the teeth 27 are carried at the top.

A rider, generally indicated at 28 in Fig. 1, and a buttress, generally indicated at 29 in that figure, cooperate with each other and the rack, to adjust the fulcrum of the dead cylinder lever, and thereby adjust the foundation brake gear.

The rider includes a box-like structure 30 having laterally extended triangular flanges 31 perforated in alignment at 32 to receive the pin 33, which forms the actual fulcrum for the lever 17. The space between the top and bottom of the box-like structure is sufficient to accommodate the dead end of the lever 17 and permit the handle portion 34 to project laterally into a convenient position for use in adjusting the brake mechanism.

Flanges 35 depending from the bottom 36 of the box-like structure and connected at their lower edges by a web 37 form a stirrup, or strap, encircling the rack and serving to hold the rider thereon. The intermediate portion of the flanges 35 and the web 37 are cut away at 38 to reduce weight.

One end 39 of the rider is equipped with a gauge 40 comprising a flat bar, reenforced by a triangular rib 41.

The buttress 29 is also a box-like structure receiving the rack bar 22, and the lower surface of the top 42 is equipped with teeth 43 adapted to cooperate with the teeth 27 of the rack. The distance between the top 42 and the bottom 44 is in excess of the thickness of the rack plus the height of the teeth 43.

At one end the top 42 of the buttress is equipped with an upright wall 45 braced by triangular flanges 46, and notched at 47 to receive the gauge 40, the underside of which is formed by two substantially parallel surfaces 48 and 49 connected by an inclined surface 50.

In Figs. 1, 2 and 3 the parts are shown in the position they normally occupy. When the brakes are applied the buttress 29 prevents the rider 28 from moving to the right and, hence, holds the fulcrum 33 of the dead lever in position.

The adjustment of the brakes is tested by rotating the dead lever 17 counter-clockwise in Fig. 1, which is accomplished by grasping the handle 34 or applying appropriate pressure in any other manner. This movement of the lever moves the brake shoes 13 towards the wheels 12 and carries the rider 28 to the left towards the position shown in Fig. 4, but the buttress 29 is left behind. When the shoes 13 have been pressed firmly against the wheels 12 the right end of the gauge 40 will, by its relation to the wall 45, indicate the condition of the brakes.

If there is a space of one or more teeth between the two parts adjustment is appropriate and is accomplished by raising the buttress and shifting it to the left until it assumes some such position as shown in Fig. 4. The proportion of the parts are such that when the buttress has been raised sufficient to disengage the teeth 43 and 27 the bottom of the notch 47 is above the surface 48 and, hence, movement of the buttress to the left will always be limited by contact of the wall 45 against the end of the gauge, thereby preventing inexperienced persons from reducing the normal brake shoe clearance.

After the parts have been brought to the position shown in Fig. 4, the buttress is released and will drop to a fully engaged position with the rack in which the bottom of the notch 47 is below the surface 48 and the dead cylinder lever may be returned to the right manually, or by a subsequent air application. As it returns to the right the surface 50 will strike the bottom of the notch 47, force the buttress into firm engagement with the rack and also silghtly lift the rider so that when the surface 49 rests on the bottom of the notch 47 the parts are firmly engaged.

The gauge 40 has a length corresponding to normal brake shoe clearance and by projecting over the buttress it prevents any adjustment of the device that would reduce the brake shoe clearance beyond the proper normal.

In the course of manufacture the gauge 40 may be made long enough for the most extreme cases and the user may cut it to correspond with the desired brake shoe travel for the particular gear.

The extreme simplicity of the structure permits it to be manufactured at small cost and enables unskilled and careless labor to make accurate adjustments. It also permits an inspector to readily check the adjustments.

The invention may be variously embodied within the scope of the broader of the appended claims, one form being the subject of a copending application for patent.

I claim as my invention:—

1. In a foundation brake gear including a dead lever, the combination of a fulcrum for said dead lever, shiftable freely in one direction a distance corresponding to brake shoe clearance without performing any take-up action, an independently adjustable buttress limiting motion of the fulcrum element in the opposite direction, and means for indicating movement of the fulcrum element corresponding to normal brake shoe clearance.

2. In a foundation brake gear including a dead lever, the combination of a rack, a fulcrum element for the dead lever freely movable in one direction relative to the rack a distance corresponding to brake shoe clearance without performing any take-up action, a buttress independently adjustable relative to the rack and limiting the relative movement of the fulcrum element in the opposite direction.

3. In a foundation brake gear including a dead lever, the combination of a rack, a fulcrum element for the dead lever freely movable in one direction relative to the rack a distance corresponding to brake shoe clearance without performing any take-up action, a buttress independently adjustable relative to the rack and limiting the relative movement of the fulcrum element in the opposite direction, and means on the fulcrum element for indicating a distance on the rack corresponding to normal brake shoe clearance.

4. In a foundation brake gear including a dead lever, the combination of a fulcrum for said dead lever, shiftable freely in one direction a distance corresponding to brake shoe clearance, an independently adjustable buttress adapted to limit movement of the fulcrum element in the opposite direction and means for limiting the approach of the buttress to the fulcrum element by a distance proportional to normal brake shoe clearance.

5. In a foundation brake gear including a dead lever, the combination of a fulcrum for said dead lever, shiftable freely in one direction a distance corresponding to brake shoe clearance without performing any take-up action, an independently adjustable buttress limiting motion of the fulcrum element in the opposite direction, and a projection on the fulcrum element indicating movement thereof corresponding to normal brake shoe clearance.

6. In a brake mechanism including a dead lever, the combination of a rack, a rider movable relative to the rack in one direction a distance corresponding to brake shoe clearance without performing any take-up action, and having a gauge projecting in the opposite direction a distance corresponding to normal brake shoe clearance and a buttress independently adjustable on the rack and adapted to limit reverse movement of the rider.

7. In a brake mechanism including a dead lever, a rack, a rider having a bearing engaging the rack and permitting it to have relative movement in one direction thereon a distance corresponding to brake shoe clearance, a buttress for the rider independently adjustable lengthwise with respect to the rack and a gauge limiting the approach of the buttress to the rider by a distance corresponding to normal brake shoe clearance.

8. In a device of the class described, a slide adapted to receive a fulcrum pin for a brake lever and a guage on the slide to indicate, without effecting an adjustment, a movement of the fulcrum corresponding to normal brake shoe clearance.

9. A brake adjusting device comprising a bar, a movable element in sliding engagement with the bar, one of such elements being fixed, an abutment element adjustably carried by the fixed element for limiting the movement of the movable element, and a gauge finger carried by the movable element corresponding in length with the normal brake slack, and adapted to indicate the correct position of the abutment element but not compelling such position.

10. In a foundation brake gear, the combination of a dead lever having a shiftable fulcrum, a relatively fixed support to which the fulcrum may be adjustably anchored, means for holding the fulcrum against brake applying stresses and a gauge finger carried by the lever corresponding in effective length to normal brake shoe clearance, and adapted to indicate, but not compel, the correct adjustment of the lever fulcrum.

11. In a device of the class described, a foundation brake gear including a dead cylinder lever, a fulcrum for said lever shiftable freely at all times in one direction a distance corresponding to total brake shoe clearance without performing any take-up action, a relatively fixed support to which the fulcrum may be anchored against movement in the opposite direction, and a gauge associated with the lever fulcrum to indicate the point of anchorage on the support corresponding to normal brake shoe clearance.

12. In a foundation brake gear including a brake lever having a shiftable fulcrum, the combination of means associated with the lever for indicating the correct position of the fulcrum in order to secure normal brake shoe clearance, but not compelling such position, said means being adapted to prevent adjustment resulting in less than normal brake shoe clearance.

13. In a device of the class described, foundation brake gear including a brake lever having a shiftable fulcrum, means permitting the fulcrum to be freely moved at all times in one direction a distance corresponding to total brake shoe clearance without performing any take-up action, an independently movable buttress limiting movement of the fulcrum in the opposite direction, and means for preventing adjustment of the buttress resulting in less than normal graze shoe clearance.

14. In a foundation brake gear, the combination of a dead lever having a shiftable fulcrum, a relatively fixed support to which the fulcrum may be adjustably anchored, independently adjustable means for holding the fulcrum against brake applying stresses, and a gauge finger carried by the lever corresponding in effective length to normal brake shoe clearance, and preventing an adjustment resulting in less than normal brake shoe clearance.

15. In a foundation brake gear, the combination of a relatively fixed guide, a brake lever fulcrum freely movable along the guide in one direction, an independently adjustable buttress on the guide limiting movement of the fulcrum in the other direction, gauge means selecting, but not compelling, the proper point of engagement of the buttress, and means carried by the fulcrum locking the buttress on the guide during brake application.

16. In a foundation brake gear including a brake lever having a shiftable fulcrum, the combination of a relatively fixed guide, a buttress adjustable along the guide independently of the fulcrum permitting free movement of the fulcrum in one direction but limiting its movement in the opposite direction, a gauge associated with the fulcrum indicating, but not compelling, proper adjustment of the buttress, and means carried by the fulcrum positively locking the buttress against movement during brake application.

17. In a foundation brake gear, a brake lever having a shiftable fulcrum adapted to be adjustably positioned to regulate the brake gear and provide proper brake shoe clearance, said fulcrum being freely movable by hand in one direction a distance corresponding to total brake shoe clearance as it exists at the time, a relatively fixed support for the fulcrum, a buttress movable independently of the fulcrum adapted to limit reverse movement of the fulcrum, and means for preventing adjustment of the buttress relative to the support unless excess slack exists in the brake gear, said means serving also to indicate the proper position of the buttress to secure normal brake shoe clearance and rendering impossible an adjustment resulting in less than normal brake shoe clearance.

In testimony whereof I affix my signature.

PERCY B. CAMP.